United States Patent [19]

Giacovas

[11] 4,004,899
[45] Jan. 25, 1977

[54] AIR FILTER CONSTRUCTION

[76] Inventor: Alfred Giacovas, 669 Wolfs Lane, Pelham, N.Y. 10083

[22] Filed: Feb. 28, 1975

[21] Appl. No.: 553,881

[52] U.S. Cl. .............................. 55/499; 55/521; 210/493 R
[51] Int. Cl.² .................................... B01D 27/06
[58] Field of Search ............... 55/490, 497–501, 55/521, 529, DIG. 31; 210/493, 493 R, 493 M, 493 B

[56] References Cited

UNITED STATES PATENTS

| | | | |
|---|---|---|---|
| 2,082,481 | 6/1937 | Christofferson | 55/500 |
| 2,206,684 | 7/1940 | Yant | 55/500 |
| 2,329,356 | 9/1943 | Moore | 55/497 |
| 2,915,426 | 12/1959 | Poelman | 55/500 |
| 3,243,943 | 4/1966 | Getzin | 55/499 |
| 3,490,211 | 1/1970 | Cartier | 55/497 |
| 3,494,113 | 2/1970 | Kinney | 55/497 X |
| 3,778,970 | 12/1973 | Swimmer | 55/138 |
| 3,795,090 | 3/1974 | Barnebey | 55/521 X |
| 3,871,851 | 3/1975 | Neumann | 55/521 |

Primary Examiner—Frank W. Lutter
Assistant Examiner—David L. Lacey
Attorney, Agent, or Firm—Ernest G. Montague

[57] ABSTRACT

A filter apparatus for removing contaminant particles from an air or gas stream, the apparatus including a filter medium, disposed therein in pleated form, across the air or gas stream to be treated. A rectangular frame has inner side walls defining therebetween a path for the air or gas stream to be treated. A filter medium is disposed in longitudinally-extending pleat form across an air or gas stream to be treated. A pleat spacer and supporting fiber is longitudinally co-extensive with the pleat filter medium. The fiber member consists integrally of a plurality of portions disposed along the pleat filter medium and of connecting portions extending at an acute angle from one end of the portion outside of the filter medium towards the other end, thereby providing a support inside the bend of each of the pleats and the connection portions extend crosswise to the pleats.

1 Claim, 3 Drawing Figures

AIR FILTER CONSTRUCTION

The present invention relates to improvements in air filter constructions, and, more particularly, to improvements in the design of the means for retaining the filtering medium in place. Thus the present invention relates to filter units having utility as a means for removing solid particles entrained in a stream of air or gas flowing therethrough and relates more particularly to certain new and useful improvements in such filter units.

The filtering medium is conventionally a mass of fibers such as glass wool coated with a tacky or cementitious substance, adapted to stop and retain foreign particles of dirt, dust, etc in an air or gas stream. The filter core thus formed is in turn enclosed within and by a jacket, envelope, or casing extending circumferentially of the assembly to hold the assembly parts together and, with them, to form a filter unit of substantial rigidity and strength. The jacket is conventionally a two-part, box-like structure whose parts nest one within the other and are each fabricated from a number of individual strips of material such as chipboard, assembled and stapled together.

The filters are called pleated or extended surface filters and comprise a rigid frame and a supporting wire grid such as a wire screen, expanded aluminum chicken wire having a plurality of openings.

It is one object of the present invention to provide means for retaining the filter medium in place which consists of a wire in coils bent in a continuous configuration of pleats which supports the filter medium. In the known wire mesh method it is necessary to glue the filter medium to the wire mesh in order to assure the holding of the filter media within the pleats of the wire mesh, so that the velocity of the air stream in the unit does not blow the filter media away from the pleated configuration. With the bent wire support of the present invention, the filter media are interwoven and securely held without the necessity of any adhesive. Unlike wire mesh, the wire means of the present invention has only one way lines for support of the filter media, which allows for a larger surface area for greater filtration.

A filter assembly for filtering contaminant particles from an air or gas stream has been proposed before which comprises an open-ended rectangular frame having inner side walls defining therebetween a path for said air or gas stream to be treated. The frame of said known structure includes an upstream dirty stream inlet and a downstream clean stream outlet. A filter medium is disposed in said frame in longitudinally-extending pleated form across the gas stream to be treated with opposed edges of said filter medium abutting against said inner walls of said frame in substantial line contact therewith and opposed ends of said medium folded to provide end folds of a breadth substantially equal to the breadth of said inner side walls of said frame to abut against said inner side walls of said frame in substantial line contact therewith and opposed ends of said medium folded to provide end folds of a breadth substantially equal to the breadth of said inner side walls of said frame to abut against said inner side walls in faced relationship therewith. Pleat spacer means which are longitudinally co-extensive with said pleated filter medium are provided and said spacer means include resilient open helical coil means having successive turns, engaged in nesting fashion with successive pleats of said filter medium along said downstream side thereof; thereby, substantially most of the body of said turns of said coil means extends in abutting relationship along the sides of the pleats to supportingly maintain said pleats in properly spaced relationship.

It is another object of the present invention to provide an economical filter structure which lends itself to easy assembly with a minimum of materials, the resulting filter structure providing a stable, effectively supported and spaced pleated filter medium which affords maximum filter area with minimum resistance to the fluid stream to be treated thereby.

It is still another object of the present invention to provide a filter apparatus for removing contaminant particles from an air or gas stream wherein the filter medium is disposed therein in pleated form across the air or gas stream to be treated. The pleats are provided in spaced relationship from each other and are maintained in such position by at least one single carrier, preferably a self-supporting wire or self-supporting fiber strand and extended during the maintenance of the pleated form along the entire filter medium.

It is also another object of the present invention to provide a filter apparatus for removing contaminant particles from the air or gas stream, wherein said wire engages alternately bending areas of the filter medium while being in pleated form. It is to be understood that fiber strands or any other suitable material can be used instead of self-sustaining metal wire, as long as the fiber strands have also self-sustaining characteristics.

With these and other objects in view which will become apparent in the following detailed description, the present invention, which is shown by example only, will be clearly understood in connection with the accompanying drawing in which.

Figure 1:
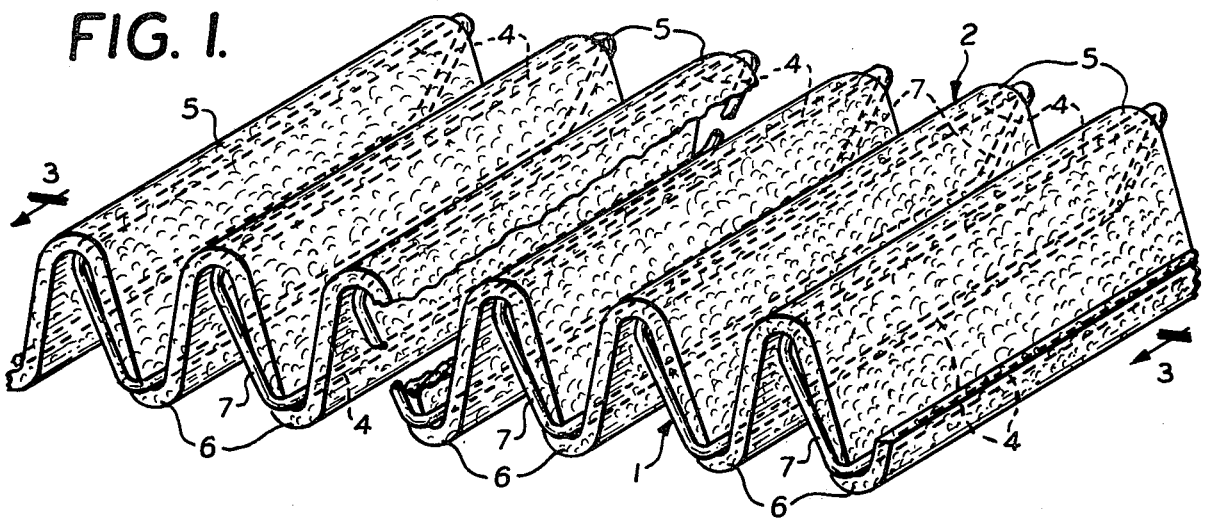
FIG. 1 is a perspective top view showing the filter medium properly supported by the metal wire carrier by indicating also the self-sustaining wire or fiber strand.
Figure 2:
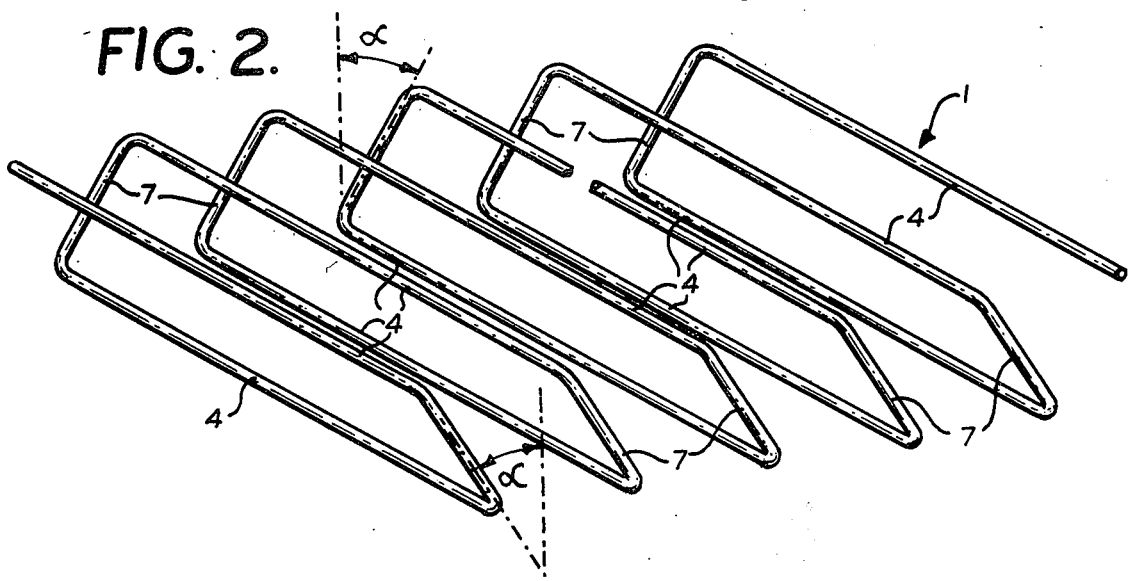
FIG. 2 is a perspective top view of the wire or fiber strand.

Referring now to the drawing, the air filter construction comprises preferably three main parts, namely a self-supporting wire- or fiber-strand 1 which serves as a support as well as a distancing means for the filter medium 2, the latter being thereby maintained in a spaced-apart pleated form, and an open-ended frame 3 receiving the filter medium 2 therein.

Figure 3:
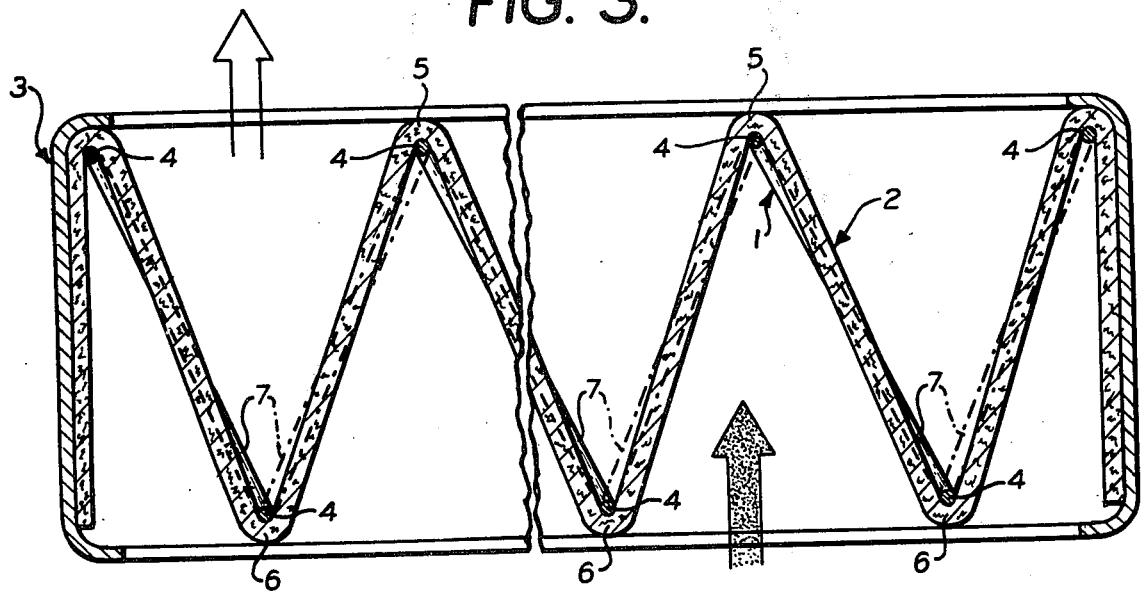
FIG. 3 is a section along the lines 3 — 3 of FIG. 1 showing the filter apparatus within an open-ended frame.

In order to maintain the filter medium 2 in its spaced-apart pleated form and supported position, the self-supporting wire- or fiber-strand 1 consists of a plurality of longitudinal upper and lower wire portions 4 alternating in upper and lower positions, which wire portions 4 engage and thus locate the pleats of the filter medium 2 at their bends, so that alternately an upper bend 5 and a lower bend 6 engage the portions 4 of the wire- or fiber-strand 1 (see FIG. 3). A connecting portion 7 connects each of the lower and upper wire portions 4 at an acute angle α upwardly or downwardly, respectively, to bring about the lateral spacing between the pleats, so that the connecting portion 7 of one wire portion 4 is directed towards the bent portion of the next opposite pleat, whereby the connecting portions extend outside of the filter medium 2. While the wire 1 continues with its wire portion 4 in the bend of the opposite pleat, it continues at the other end of the wire portion again at an acute angle α towards the next bend 5 of the pleat. Due to the fact that the longitudinal portions of the wire-or fiber-strand 1 lie on the inside of each pleat, it is necessary to feed the portion 7 of the wire- or fiber-strand 1 from one side of the filter medium 2 to the opposite side, at the same time assuring that the portions of the wire- or fiber-strand 1 are always inside of the respective pleats.

While I have disclosed one embodiment of the present invention, it is to be understood that this embodiment is given by example only and not in a limiting sense.

I claim:

1. A filter assembly for filtering contaminant particles from a gas stream, comprising
   a filter medium disposed in the form of a plurality of spaced-apart pleats and defining a plurality of corrugations,
   a self-supporting fiber strand supporting said filter medium and including a plurality of longitudinal portions and forming a plurality of corrugations in order to maintain said filter medium in its spaced-apart pleated form,
   each of said longitudinal portions being disposed in a bend of said pleats of said filter medium, so as to locate the longitudinal portions of said strand on alternate opposite sides of the filter medium for engagement with said filter medium at said bends of said filter medium,
   said fiber strand including connecting portions connecting the ends of each of said longitudinal portions; yield the spacing between said pleats, and
   said connecting portions of each of said longitudinal portions being directed towards the adjacent bend of the next opposite of said pleats, and said connecting portions are disposed outside of said filter medium.

* * * * *